(12) United States Patent
Welch

(10) Patent No.: US 7,788,834 B2
(45) Date of Patent: Sep. 7, 2010

(54) WEARABLE ARTICLE HAVING A BACKLIT LENTICULAR DISPLAY

(76) Inventor: Stephen R. Welch, 6478 Hanover Ct., Lisle, IL (US) 60523

( * ) Notice: Subject to any disclaimer, the term of this patent is extended or adjusted under 35 U.S.C. 154(b) by 576 days.

(21) Appl. No.: 11/429,554

(22) Filed: May 5, 2006

(65) Prior Publication Data

US 2006/0250695 A1 Nov. 9, 2006

Related U.S. Application Data

(60) Provisional application No. 60/738,346, filed on Nov. 18, 2005, provisional application No. 60/678,366, filed on May 7, 2005.

(51) Int. Cl.
*G03B 25/02* (2006.01)
(52) U.S. Cl. .................. 40/454; 40/661.04; 40/544; 156/291; 156/275.3; 156/308.4
(58) Field of Classification Search .............. 40/661.04, 40/544, 454; 156/241, 290, 291, 275.1, 275.3, 156/275.7, 308.4
See application file for complete search history.

(56) References Cited

U.S. PATENT DOCUMENTS

| | | | |
|---|---|---|---|
| 5,667,417 A | 9/1997 | Stevenson | 445/24 |
| 6,116,745 A * | 9/2000 | Yei | 362/105 |
| 6,422,859 B1 * | 7/2002 | Demetz | 431/126 |
| 6,596,361 B2 * | 7/2003 | Klein et al. | 428/42.3 |
| 6,865,033 B2 | 3/2005 | Laverty | 359/819 |
| 7,009,688 B2 | 3/2006 | Miller et al. | 355/71 |
| 7,030,555 B2 | 4/2006 | Nakamura et al. | 313/504 |
| 7,083,295 B1 * | 8/2006 | Hanna | 362/84 |
| 2003/0227683 A1 * | 12/2003 | Sewall et al. | 359/530 |
| 2004/0144481 A1 | 7/2004 | Poulos et al. | 156/230 |
| 2005/0000128 A1 * | 1/2005 | Chen | 40/454 |
| 2005/0013128 A1 * | 1/2005 | Worthington | 362/84 |

(Continued)

FOREIGN PATENT DOCUMENTS

CA 2176330 A1 11/1997

(Continued)

OTHER PUBLICATIONS

Article—Ioannis Kymissis, "Basic Plan for Making the 6.076 Electroluminescent Backlight" (2001).

(Continued)

*Primary Examiner*—Gary C Hoge
(74) *Attorney, Agent, or Firm*—Winston & Strawn LLP

(57) ABSTRACT

The present invention provides a wearable article such as clothing, backpacks, hats, and the like that include a backlit lenticular lens display that emits light to allow animation and special effects. The array of interlaced images can be printed directly onto the electroluminescent panel, onto a removable support sheet, or onto the back surface of the lenticular. The electroluminescent panel is laminated to form a flange portion that is radio frequency welded to bond the lenticular display device to an article that is impregnated with a bonding material. A backing material having a fabric layer and a water impenetrable layer can be affixed to the assembly such that the fabric layer contacts the skin. Alternatively, the article may have a surface a display compartment or envelope with a transparent outer surface for enclosing the electroluminescent layer, a removable image sheet, and a lenticular lens layer.

23 Claims, 3 Drawing Sheets

U.S. PATENT DOCUMENTS

| | | | |
|---|---|---|---|
| 2005/0041414 A1 | 2/2005 | Petre | 362/105 |
| 2005/0111210 A1 | 5/2005 | Ono | 362/84 |
| 2005/0164590 A1 | 7/2005 | Gotthardt | 445/24 |
| 2006/0269744 A1* | 11/2006 | Murasko et al. | 428/357 |
| 2006/0278109 A1* | 12/2006 | Johnson et al. | 101/415.1 |

FOREIGN PATENT DOCUMENTS

| | | |
|---|---|---|
| WO | WO 96/21172 A1 | 7/1996 |
| WO | WO 97/49948 | 12/1997 |
| WO | WO 2005/018353 A2 | 3/2005 |

OTHER PUBLICATIONS

Article—Ioannis Kymissis, "Lab Guide for 9.976 Lab #1" (2001).

Article—"Printing Guidelines for Thick Film Conductors Used in Power Applications", DuPont Microcircuit Materials.

Article—"7162 Translucent Conductor for use with EL Lamps ", DuPont Microcircuit Materials.

\* cited by examiner

WEARABLE ARTICLE HAVING A BACKLIT LENTICULAR DISPLAY

This application claims the benefit of U.S. provisional application 60/738,346 filed Nov. 18, 2005 and 60/678,366 filed May 7, 2005, the entire content of each of which is expressly incorporated herein by reference thereto.

BACKGROUND OF THE INVENTION

This invention pertains to wearable articles such as clothing, backpacks, hats, and the like that include visual displays thereon, and more particularly, to such articles that include advertising and decorative displays that utilize lenticulars and that are provided with electroluminescent lamp illumination.

Conventional print advertising and packaging is accomplished by printing stationary non-moveable information and pictures on magazines, posters, billboards, signs, clothing, etc. A primary purpose of an advertisement is to attract the attention of the reader (customer) and convey the desired information.

In an effort to attract the customer's attention, various types of electrical signs have been installed, such as illuminated signs, including neon signs, illuminated billboards, marquees with moving messages, blinking lights, etc. Electrical signs, however, are often very costly, bulky, generate undesired heat, and are difficult to repair. Further, electrical signs are also not practical for packages, clothing, etc. It is, therefore, desirable to provide an improved display which overcomes most, if not all, of the preceding problems.

A lenticular display allows a viewer to perceive multiple images appearing individually within the same dimensional space or plane. A lenticular sheet is made from a plurality of parallel semi-cylindrical or hyperbolic shaped lenticules which serve as lenses or prisms having the same width. Underneath the lenticular sheet are two or more images broken up into a plurality of thin strips or columns which are interleaved to form a composite image. When the interleaved composite image is placed beneath a lenticular sheet, the lens refract the light differently for each spaced column so that each eye of the viewer is constantly viewing one of the interleaved images separately from the other eye viewing the other image to create a three dimensional lenticular image without the use of a separate viewing apparatus. As the person moves position relative to the device the image viewed repeatedly changes from one image to the other. Photosteroscopic lenticular images provide a three dimensional image without the use of a steroscopic viewers or the use of special glasses, so that each eye of a person views a slightly different image. Lenticulars can also be used to simulate animation and morphing affects such as zoom views of an image.

A common method of attaching the image to the lenticular is with the use of adhesives, however this configuration is undesirable in that it is prone to distortion of the image. Given that the plurality of lenticules have a focal point of a predetermined distance on the rear flat side of the lens where the image is mounted, an adhesive layer disposed between the lenticules and the image has an inherent thickness which increases the spacing of the image and lenticule beyond the predetermined focal point of the lenticules. This results in ghosting or crosstalk distortion between the images, which is a phenomenon that occurs when the viewer sees two or more images at the same time from a single viewpoint of a lenticular image. It is therefore important to have intimate contact between the lens and image for high quality images.

PCT publication WO 96/24490 discloses a lenticular decorative device for use in garments, wherein the lenticular is bonded to the garment with a pressure and temperature sensitive adhesive. While this reference overcomes the ghosting problems discussed above by printing directly onto the lenticular, this disclosure relies solely on ambient light to illuminate the image. As a result, the effectiveness of the display device is limited to conditions where sufficient ambient light is available, and directed towards the image. Such a limitation is particularly undesirable for a garment lenticular wherein the positioning of the lenticular, materials, and color of the garment itself may diminish the available ambient light.

In an effort to increase the visibility of the lenticular, US Patent Application Publication Nos. 20050111210, and 20050041414 disclose backlit lenticulars for use with a garment. Herein, an electroluminescent ("EL") lamp is associated with the lenticular to form an assembly, which is affixed to the exterior of the garment with various types of fasteners. However, the fasteners disclosed are disadvantageous because they are subject to damage, and fail to provide a sufficient bond to withstand extended use. Further, a drawback of the use of EL lamps is that they are susceptible to moisture damage, and this can occur when the garment becomes wet such as from being in the rain or if a liquid is spilled on it.

Therefore, there is a need for new displays that provide less image distortion and that are illuminated while the EL lamps are protected from moisture, and provide an improved method for fastening the display to the garment. The present invention now addresses these needs and provides new displays for us in particular on wearable articles.

SUMMARY OF THE INVENTION

The present invention relates to a lenticular display device, and in particular to a combination comprising a wearable article that has a backlit lenticular assembly associated therewith, the backlit lenticular assembly comprising a lenticular, an electroluminescent panel for providing backlight, and an image(s) provided between the lenticular and electroluminescent panel, wherein the backlight illuminates the image(s) to provide greater visibility and an enhanced appearance to the image. The image(s) may be provided on either the lenticular, electroluminescent panel, or on a removable support member that is placed between the lenticular and electroluminescent panel.

In one embodiment the lenticular, image(s), and electroluminescent panel, are affixed to the wearable article by bonding as an integral combination. Preferably the article is impregnated with a bonding material to facilitate the affixing of the lenticular display device to the article. Alternatively, the lenticular, image(s), and electroluminescent panel can be bonded together as an integral unit and then affixed to the article.

Advantageously, the lenticular display device may include a backing material having a flange for attachment to the bonding material impregnated within the article to form a sealed assembly. The backing material typically includes a first layer of a water penetration resistant material and a second layer of fabric with the first layer being positioned proximate the electroluminescent panel.

In another embodiment of the invention, the article may include a compartment and the lenticular, image(s), and electroluminescent lamp of the display device is placed in the compartment. It is desirable for the compartment to have a transparent viewing window adjacent the lenticular and the image(s) is provided on a support and in a manner that facilitates removal and replacement of the image(s) and support. In the preferred arrangement, the image(s) are adhered to the support with an optically clear adhesive so that it is removable with the lenticular.

The lenticular display device, which employs a battery for powering the electroluminescent panel, can be employed with any wearable article such as a shirt, blouse, bra, pants, shorts, bathing suit, vest, coat, jacket, robe, scarf, backpack, fanny pack, or belt.

The method of preparing the combination of the wearable article having a backlit lenticular assembly associated therewith, includes attaching a lenticular, an electroluminescent panel for providing backlight, having an image(s) provided between the lenticular and electroluminescent panel to the article. Prefereably, the article is impregnated with a bonding material in a predetermined pattern that corresponds to an outline that surrounds the assembly, and the backlit lenticular assembly is attached to the article through the bonding material. In this embodiment the image(s) may be affixed to the lenticular sheet or the electroluminescent panel.

Additionally, it is beneficial to laminate the electroluminescent panel with a water penetration resistant material which forms a flange portion. This allows aligning the lenticular, electroluminescent panel, and bonding material, and radio frequency welding such that the flange portion of the electroluminescent panel is bonded at two distinct locations to the lenticular and the bonding material of the article as an integral unit. In alternative to radio frequency welding, the lenticular assembly can be appliquéd to the bonding material to form an integral unit.

Another feature of the invention includes applying a backing material to the unit and sealing the unit to the bonding material of the article. Desirably, the backing material having a first layer of water penetration resistant material and a second layer of fabric, and positioning the first layer proximate the electroluminescent panel.

An alternative method of preparing the combination comprises forming a compartment in or on the article and inserting into the compartment a lenticular, an electroluminescent panel for providing backlight, and an image(s) provided between the lenticular and electroluminescent panel. The backlight serving to illuminate the image(s) to provide greater visibility and an enhanced appearance to the image. In this embodiment the image(s) may be affixed to the lenticular, the electroluminescent panel, or to a support which is removably attached to the assembly. Preferably, this method further comprises forming the lenticular, image(s), and electroluminescent panel as an integral unit, which is removably contained in the compartment. Further, the compartment may be radio frequency welded to the bonding material. Ideally, the compartment is formed with a transparent viewing window adjacent the lenticular.

In the method discussed above, it is preferable that the bonding material is Plastisol ink with a water penetration resistant resin, which is impregnated into the article by silk screening.

DETAILED DESCRIPTION OF THE PREFERRED EMBODIMENTS

Figure 1:
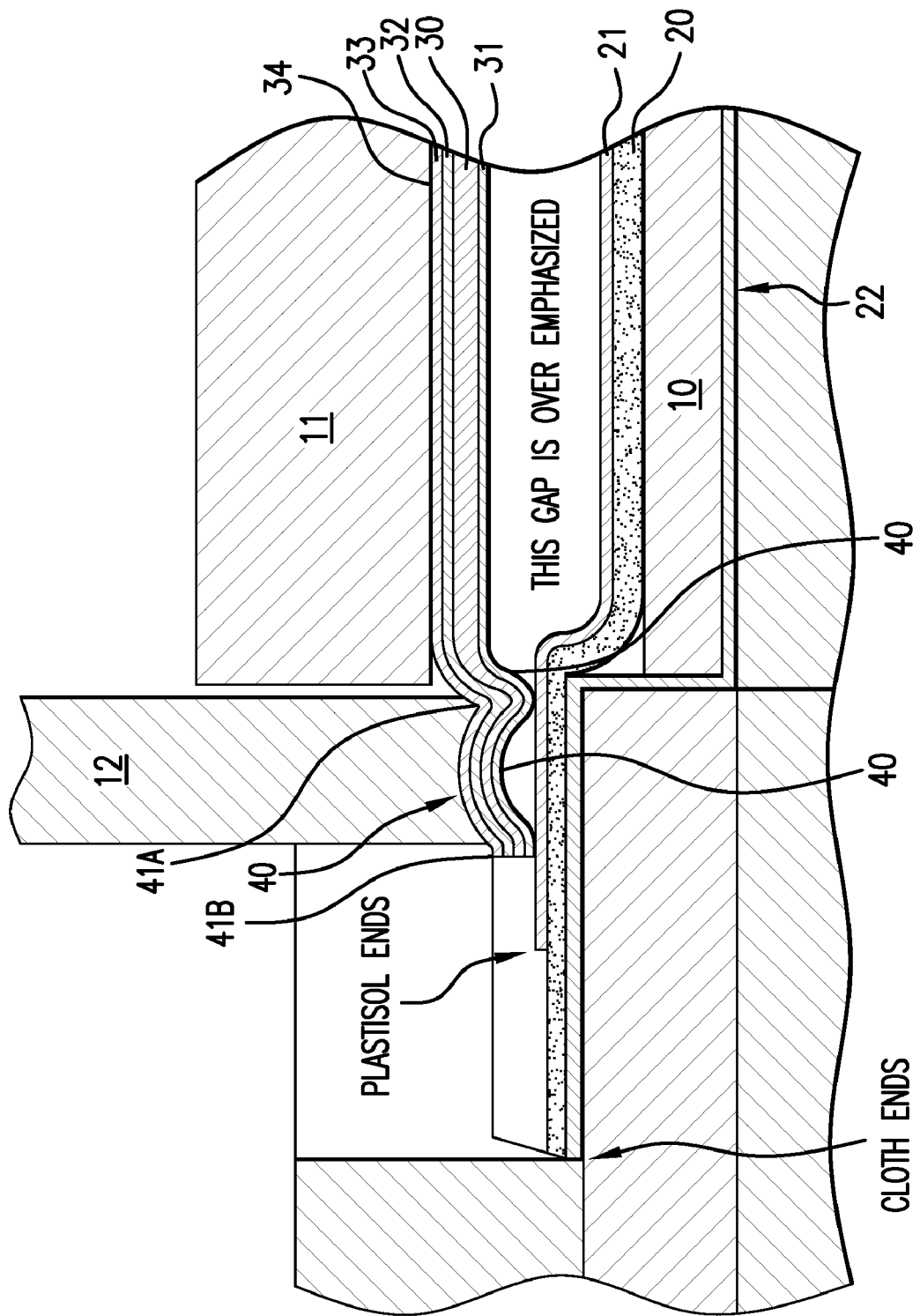
FIG. 1 depicts a cross sectional view of the backlit lenticular display and article as an integral combination, with the fixture for affixing the combination.

The present invention relates to a display device for displaying one or more removable images or through a lenticular lens, and in particular, to a lenticular lens having an electroluminescent light source, attached to a wearable article such as a garment.

According to a preferred embodiment of the present invention, a backlit lenticular display device is adapted for use with apparel by printing images within a lenticular display device having a electroluminescent panel providing enhanced visual and optical characteristics and decorative appeal, and affixing the lenticular display device onto a fabric substrate. More particularly, the invention relates to a method, and an article formed by that method, of printing optical images possessing depth of field, i.e., three-dimensional and/or the appearance of motion, i.e., animated imagery in communication with a lenticular sheet, incorporating an electroluminescent light source, and bonding such a device to an article such as, an article of wearing apparel such that the image is distortion free. The lenticular display device may be oriented in any position and affixed to any portion of the article. Each element of the device as well as the bonding processes will be discussed in detail below.

In forming the lenticular sheet, it has been found that any transparent material can be used. While glass is possible, it is not preferred due to its relative brittleness. What is preferred for use in the present invention is a clear, flexible polymer, such as, for example, thermoplastic elastomers, polyvinyl chloride, polypropylene and polyethylene. In those instances where the perception of depth, for example 3-D, or motion, such as animated imagery is sought to be achieved, a lenticular plastic, which is a sheet or layer of plastic that has a series of lenses running along its length, is required. Where the appearance or perception of depth is not needed, the lenticular can be employed for morphing, zoom, or animated visual affects. These lenticulars can be designed to magnify or amplify or even to shrink or compress the image to achieve the desired visual effect. Also, color changes can occur when the lenticular is viewed at different angles, if desired. Such transparent materials and in particular the lenticular plastics can be made by well-known prior art methods. These plastic materials can be made by calendaring, injection molding, hot pressing, etc., and any such process can be employed in accordance with the present invention.

All of the plastics mentioned herein possess certain physical and chemical qualities which make them particularly suitable for use in accordance with this invention. These qualities are texture or feel, and of particular importance to the present invention, the ability to be washed and dried repeated times without becoming brittle or stiff, as well as optical clarity and printability.

The image of the lenticular display device may be composed of an array of interlaced images which when viewed through the lenticular lens create the 3-D or morphing affect as desired. This array of interlaced images can be printed directly onto the lenticular sheet, directly onto the electroluminescent panel, or onto a separate sheet which is then removably affixed to the electroluminescent panel or lenticular sheet, each of these methods will be discussed in detail below. Further, it is possible to provide lenticular sheets of varying colors associated with different designated viewing angles. For example, the lenticular device may display a series of colors such as red, white, and blue, as a viewer's perspective moves or changes relative to the lenticular display. All of these are considered to be images in accordance with the invention, and are distinguishable from the single color or clear lenticular of the prior art.

When printing the image directly onto the lenticular sheet, the reverse of the desired image, whether it is a depiction of an animal, an athlete, a cartoon character, commercial slogan, trademark, etc. is printed on the back or rear surface of the lenticular plastic sheet. In other words the array of interlaced images is printed on the flat surface of the sheet, which is opposite the array of raised cylindrical or hyperbolic lenticules. The reverse of any of the foregoing images is imprinted on the back or rear surface of the plastic sheet by means of, for example, lithography, or silk screening. If desired, other types of printing, e.g., ink jet printing, can also be used, if desired.

It is also possible to print the array of interlaced images directly onto the electroluminescent lamp or panel. First the electroluminescent components such as the cathode, phosphor, anode, etc. are silk screened onto a clear polymeric substrate (e.g. PVC). An example of a conventional method of forming electroluminescent panels is disclosed in U.S. Pat. No. 5,667,417, the entire disclosure of which is expressly incorporated herein by reference thereto. Next the interlaced graphics are silk screened over the electroluminescent panel employing a four color process (cyan, magenta, yellow, and black).

There are some applications where the printing directly onto the electroluminescent panel would not be practical because the image would be permanently affixed to the lenticular display. In the interest of increasing the flexibility and range of applications, the array of interlaced images may be silk screened onto a substrate sheet which is then affixed to the lenticular assembly. Preferably, such a substrate or support sheet is made of a thermoplastic or other transparent film. As discussed above, due to the focus point behind each lens of the lenticular sheet, the spacing between the image and the lenticular is critical. As such it is undesirable to affix the image sheet to the lenticular sheet with an adhesive layer since this often adversely affects the visibility of the image by increasing the distance between the lenticular and the image. Accordingly, when printing the array of images onto a substrate sheet, it is advantageous to employ a series of registration devices (e.g. polls, pins, protrusions, etc.) on the electroluminescent panel for precisely registering the image sheet with the panel. Furthermore, in this embodiment the lenticular sheet is formed with corresponding holes or notches to correspond with the registration devices of the panel, thereby ensuring precise alignment of the panel, image sheet, and lenticular sheet to prevent distortion of the resulting illuminated images.

These printing methods will insure a high degree of clarity and brilliance of color, for example in four color (cyan, magenta, yellow, and black) printing at least 300 dots per inch. Disposing each color at a different angle will serve to provide a living color image without moiré or interference. The printing methods of the present invention provide for each pixel of the image, represented at the optical focal point of the lenticular, to have a photon emitted from the electroluminescent panel which perpendicularly penetrates the pixel thus minimizing the scattering and ghosting of the image. The resulting image provides the appearance of motion, morphing, flip, or zoom of the image as the viewer's perspective or distance and angle to the lenticular changes.

A bonding material can be used to adhere the lenticular assembly to the wearable article. A preferred bonding material comprises plastisol ink that is doped with PVC vinyl resin and that is preferably applied to the article by silk screening onto the surface of the article in order to provide a desired elasticity to the combination. The bonding material is then forced into the article by using a bull nose squeegee to impregnate the article with the bonding material, after which the bonding material is heat cured with an infrared flash to mechanically bond the plastisol ink and vinyl resin to the fibers of the article. For other applications that are less critical as to the thickness of the bonding material, conventional adhesives that are compatible with the device and article can be used.

As discussed above, electroluminescent panels are prone to moisture degradation, which is particularly problematic in the present application of the backlit lenticular which may routinely entail exposure to moisture during laundering of the combination. Therefore the present invention can be used to form a waterproof backlit lenticular display device to overcome this vulnerability and to enable the device to withstand repeated washing of the lenticular-article combination. In order to achieve this feature, the electroluminescent panel is laminated on both sides with a PVC layer that extends beyond the border of the panel to form a flange portion which will be bonded to the lenticular and article as will be discussed below.

It is important to note that the size and shape device are not critical and can be selected determined upon the size of the article to which the device will be associated. For example, if the device is to be attached to a shirt or jacket, the size of the device can range from a rectangle or square of dimensions between 2" and 24" in length and between 1" and 24" in width, although larger or smaller sizes can be utilized if desired. Many typical sizes range between 2" and 12" in length and between 1" and 8" in width. Length to width ratios may range from between 4:1 to 1:1 and preferably are between 2:1 and 1:1. And instead of square or rectangular shapes, the device can be of other polygonal shapes, or also can be round or oval. Combinations of straight sides and rounded edges or sides can also be used. The diameter of round shaped devices can range from about 0.25" to 24" or more, with 0.5 to 7" being preferred. The illuminated area of the device can range from as little as 0.5 to 625 square inches, with around 1 to 150 square inches being common. A skilled artisan can select the desired size and shape for any particular article or final application.

A preferred process of permanently bonding the backlit lenticular display device to the article will now be discussed with reference to FIG. 1. A fixture such as a die cut apparatus is employed having an anvil member (10), and corresponding pressure plate member (11), and a sealing die member (12) having an arcuate face portion which engages the lenticular in two locations. In operation, the anvil (10) will hold the wearable article (20) with the impregnated bonding material (21) in a fixed position. Next the electroluminescent panel (30), having laminations (31, 32) on either side which extend to form flange portion (40), is placed in engagement with the article such that the border of the bonding material (21) coincides with the flange portion (40) of the electroluminescent panel (30). Thereafter, the lenticular sheet (34) is placed in engagement with the electroluminescent panel (30) such that the image (33), whether printed onto the rear surface of the lenticular or printed on the electroluminescent panel, is positioned between the lenticular sheet (34) and the electroluminescent panel (30). The lenticular sheet (34) is sized to cover the entire image and extends over the flange portion (40) of the electroluminescent panel (30) to facilitate bonding. Upon proper alignment of each component, the pressure plate (11) compresses the article (20), bonding material (21), the electroluminescent panel (30), and the lenticular sheet (34). The sealing die member (12) engages the flange portion (40) at two locations (41*a*, 41*b*) to form a pair of radio frequency seals.

The flange portion (40) of the electroluminescent panel (30) protects the electrical elements of the electroluminescent panel (e.g. anode, cathode, phosphor, etc.) and image (i.e. ink) from the radio waves emitted during radio frequency welding which might melt or otherwise adversely affect the panel and image. Further, the flange portion (40) provides the surface area required to form an equator bond. The equator bond is formed by forming two distinct bonds at the two contact points (41a, 41b) of the sealing die member (12). The forming of a two seal equator bond is advantageous because it provides increased flexibility and durability of the union between the article and the backlit lenticular. Due to the fact that when the bonding material is welded in a radio frequency field, the vinyl resin is transformed into a liquid, which under the pressure applied by the die (12), redistributes the resin away from the point of contact to provide a reinforced seal. The compressive force of the die member (12) forces the resin proximate seal (41b) inward towards seal (41a) to provide a localized surplus of resin, and thus enhance pliability near seal (41a). Similarly, the compressive force of die member (12) forces the resin proximate seal (41a) inward towards the electroluminescent panel (30), thereby providing a reinforced seal (41a) with a localized surplus of vinyl on either side of the bond which enhances the durability of the weld.

Additionally, a fabric (22) may be employed as a backing material to form a sealed assembly of the backlit lenticular display and the article. In fact the backing material can be any porous material that provides a sufficient barrier between the user's skin and the PVC of the electroluminescent lamp, or impregnated plastisol ink. In this embodiment, one side of the backing material is laminated with a water impenetrable material (e.g., PVC) to create a backing material having a first preferably fabric layer, and a second layer of water impenetrable material. Further, the backing material is formed with a flange for attachment to the bonding material which is impregnated within the article as discussed above. The fabric layer of backing material is disposed adjacent the user's body such that it is the only component of the assembly that contacts the skin.

The laminated layer of water impenetrable material is disposed proximate the backlit lenticular assembly and facilitates the bonding of the flange of the backing material to the flange portion (40) of the backlit lenticular display. The use of such a backing material is advantageous in that it provides an intermediate fabric barrier between the user and the PVC laminated components (i.e. the electroluminescent lamp, impregnated bonding material, and laminated layer of the backing material) which improves the comfort of the user by compensating for the tendency of PVC to induce sweating when in contact with skin.

In addition to radio frequency welding as discussed above, the backlit lenticular and article can be assembled by appliqué bonding. In this process, the components of the lenticular display (i.e. lenticular, image, and laminated electroluminescent panel) are arranged as discussed above, and the backing material is aligned and appliquéd such that the lenticular display is bound to the surface of the impregnated bonding material. Other adhesives or joining methods can be used if desired.

Figure 2:
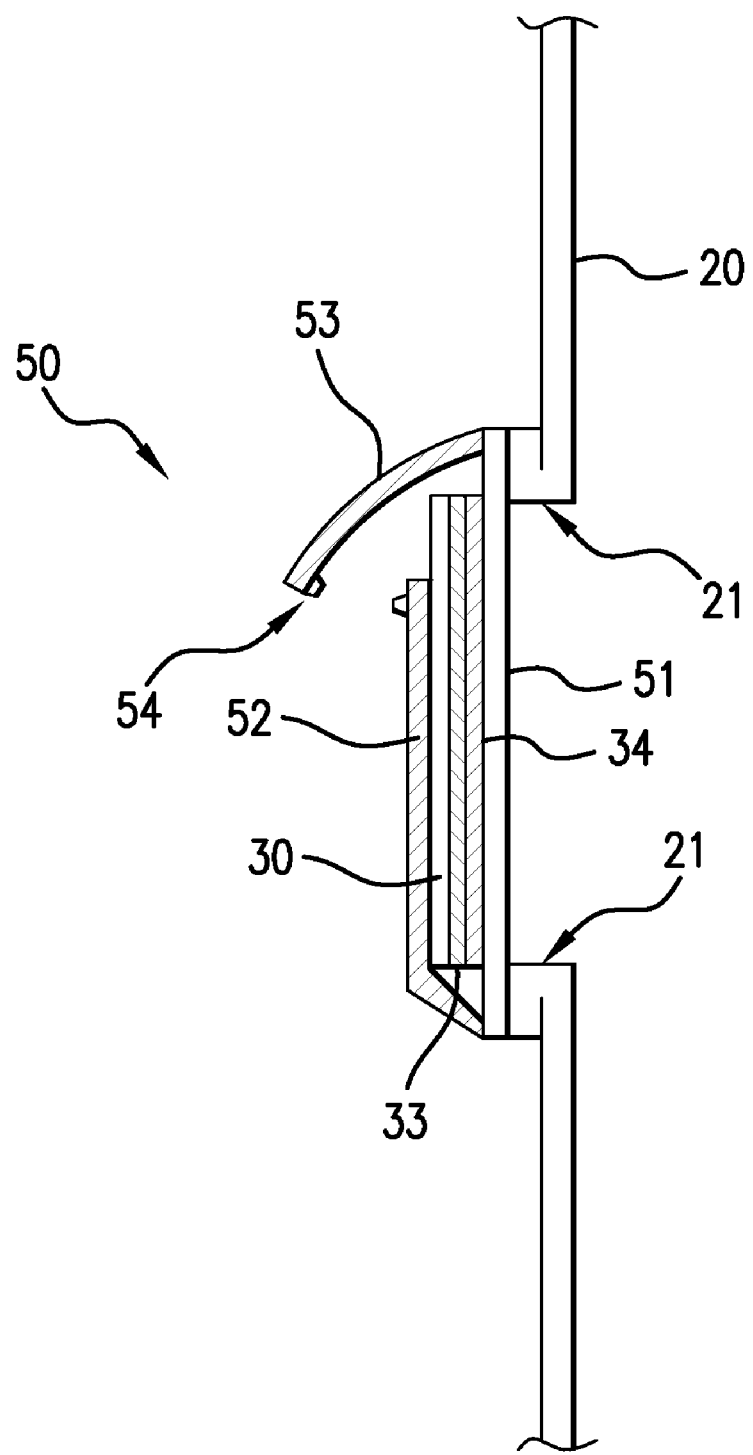
FIG. 2 depicts a cross sectional view of the backlit lenticular display as an integral unit received within a compartment of the article.
Figure 3:
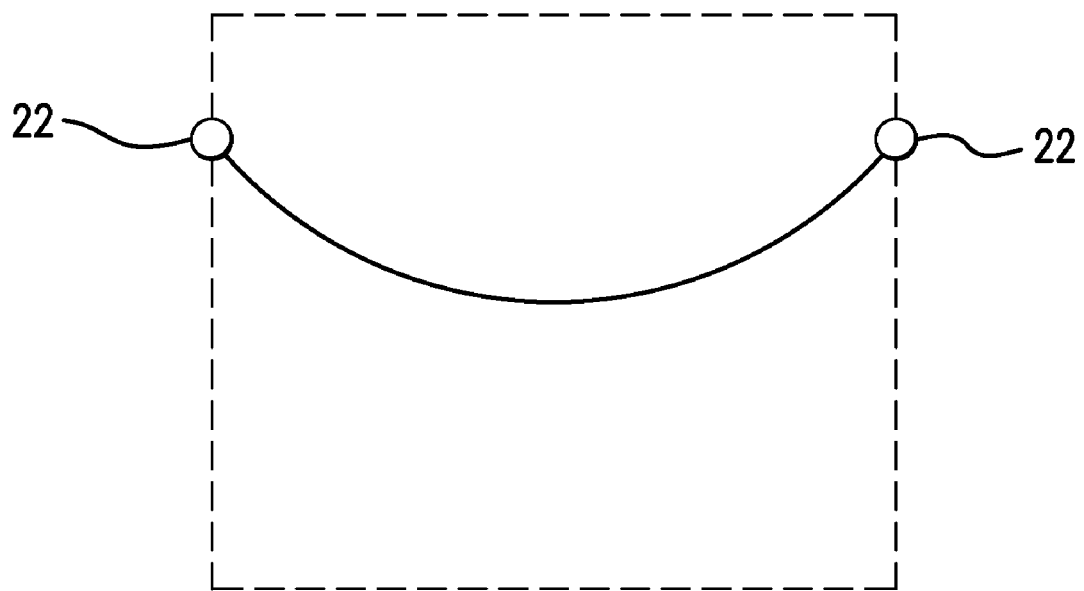
FIG. 3 depicts a front view of the article with a die cut terminating in holes to prevent tearing.

In the alternative to forming the backlit lenticular and article as an integral combination which is permanently bonded, a compartment may be formed on, or within, the article for receiving a backlit lenticular display. As illustrated in FIGS. 2 and 3, the compartment comprises a substantially flat envelope (50) having a porous back surface (52) and a transparent PVC front surface or viewing window (51), either surface can be affixed to the article so long as the visibility of the viewing window is not substantially obstructed. In other words, if the envelope is affixed to the exterior of the article, the back surface (52) is attached to the article, whereas if the envelope is affixed within or on the interior surface of the article, the border of the transparent front surface (51) can be affixed to the article as illustrated in FIG. 2.

This envelope can be either radio frequency welded via the equator weld as discussed above, or stitched to the article. To affix the envelope to the article, first a whole is die cut into the article and the resulting edges of the hole (21) are folded back prior to stitching to provide a smooth edge surrounding the whole which prevents the fibers of the article from freying or unraveling. Furthermore, the ends of the die cut terminate in holes (22) which prevent tearing and further extending of the die cut by allowing for stretching upon installation of the lenticular display device. While stitching provides the most cost effective method of affixing the lenticular display to the article, it is not as efficient as welding is for large scale production.

The envelop comprises an opening along one edge for receiving the lenticular display components, and a flap portion (53) extending over the opening. Preferably the flap portion has a closure device (54) such as slidable fastener, hook and loop fasteners, etc., for securing the lenticular display components within the envelope. Where the compartment is affixed within or on the interior surface of the article, a portion of the article (20) is die cut as discussed above to create an opening, and upon affixing the compartment to the article, the viewing window (51) corresponds to the opening so that the image (33) is visible The transparency of the front surface or viewing window (51) need not be total, but need only be sufficiently transparent to allow light from inside the envelope to escape through the front surface. Inside the envelope is an electroluminescent lamp layer (30) in contact with the back surface of the envelope, the laminated layers and flange portion of the electroluminescent lamp, and impregnated plastisol ink layer are omitted in FIG. 2 for the sake of clarity of the illustration. In this embodiment the array of interlaced images may be printed on the electroluminescent lamp, lenticular sheet, or a removable support member (33) which can be removably attached to the electroluminescent panel via a registration mechanism such as pins (not shown) as discussed above. Further, the entire lenticular display, i.e. the electroluminescent, image(s), and lenticular sheet can be bonded as a first unit, which is then inserted into the viewing compartment which is affixed to the article.

In contact with the image layer is a lenticular lens layer (34), which is in contact with the front surface (51) of the envelope. This embodiment is advantageous in that it allows the user to interchange various image sheets (33) to alter the aesthetic appearance, thus providing a greater range and flexibility of applications. Further, the components of the backlit lenticular device may be removed from the compartment prior to laundering to further protect and prolong the life of the backlit lenticular.

The backlit lenticular display device can be associated with the wearable article in any one of a number of ways including sewing, stapling, adhesive bonding, snap fastening, hook and loop fasteners, zippers, or the like. As noted above, the most preferred way to associate the backlit lenticular display with the wearable article is by radio frequency welding, or by providing a viewable compartment on or in the article for receiving a removable lenticular display.

To energize the electroluminescent lamp a signal is brought by a wiring harness from a pack comprising a battery power source and an electrical inverter. The function of the inverter is to convert the direct current from the battery to an alternating current known to persons of skill in this art as sufficient to cause the electroluminescent layer to emit light. The pack further comprises a control electronic circuit that determines when the lamp emits light. A simple control can be one that is on on-off switch or one that causes the lamp to flash periodically. A more complex arrangement could involve a electroluminescent lamp that is divided into segments. In effect each segment functions as an independent electroluminescent lamp receiving a potential from the inverter and having a pattern of illumination that is determined by the control electronic circuit. The segments can be as small as desired in order to provide a display of any desired detail. The preferred electroluminescent lamp has a brightness of three hundred lumens. The wiring harness connects to the electroluminescent lamp through a hole that is formed in the laminated layers, and an additional hole in the envelop, where the lenticular display is affixed by way of the compartment embodiment.

The lenticular display device can be utilized with any type of wearable article, including garments or clothing, carrying items, such as backpacks, fanny packs, purses, satchels, bags, briefcases, and other articles for carrying or transporting items. The device is suitable for use with any wearable article including a shirt, blouse, bra, underwear, pants, hats, shorts, bathing suit, vest, coat, jacket, robe, scarf, apron, or belt. As a battery is necessary for powering the electroluminescent panel, the battery can be designed to be hidden in the article to the extent possible. A conventional nine-volt battery is sufficient to provide the power for the electroluminescent lamp and is of sufficiently small size to be unobtrusively accommodated in the article.

While the invention has been described with reference to preferred embodiments, those skilled in the art will appreciate that certain substitutions, alterations and omissions may be made to the embodiments without departing from the spirit of the invention. For example, the battery and inverter can be replaced by a cord and plug for AC operation for energizing the lamp only when the wearable article is stationary or only being moved within the length of the cord and any extension cord that maybe used. This can also be used when the lamp is only to be energized temporarily, such as when the article is not being worn. Of course, the advantages of battery operation enable the user to wear the article while the lenticular is illuminated. Accordingly, the foregoing description is meant to be exemplary only, and should not limit the scope of the invention.

What is claimed is:

1. A method of preparing a combination of a wearable article having a backlit lenticular assembly associated therewith, the assembly including a lenticular, an electroluminescent panel for providing backlight, and an image or images provided between the lenticular and electroluminescent panel, which method comprises: impregnating the article with a bonding material in a predetermined pattern that corresponds to an outline that surrounds the periphery of the assembly or a compartment for the assembly; and either (a) attaching the assembly or compartment to the article by the bonding material, or (b) forming a compartment in or on the article and inserting the assembly into the compartment; wherein the backlight illuminates the image(s) to provide greater visibility and an enhanced appearance to the image.

2. The method of claim 1, wherein the bonding material contains a plastisol ink and a water penetration resistant resin, and the method further comprises silk screening the bonding material onto the article to form the outline as a band adjacent the perimeter of the assembly or compartment to provide a seal between the bonding material and the perimeter of the assembly or compartment.

3. The method of claim 1, which further comprises affixing the image(s) of the assembly of process (a) to the lenticular.

4. The method of claim 1, which further comprises affixing the image(s) of the assembly of process (a) to the electroluminescent panel.

5. The method of claim 1, which further comprises forming a flange portion of the bonding material to facilitate joining of the laminated electroluminescent panel to the bonding material on the article, wherein the flange is sealed by an equator bond formed by two distinct bonds at two separated contact points on the bonding material.

6. The method of claim 5, which further comprises aligning the lenticular, electroluminescent panel, and bonding material of the assembly of process (a), and radio frequency welding the flange portion of the electroluminescent panel to the lenticular and the bonding material of the article to form an integral unit.

7. The method of claim 1, wherein the backlit lenticular assembly of process (a) is appliquéd to the bonding material to form an integral unit.

8. The method of claim 1, which further comprises applying a backing material to the backlit lenticular assembly of process (a) to form a unit and sealing the unit to the bonding material of the article.

9. The method of claim 8, which further comprises providing a backing material having a first layer of a water penetration resistant material and a second layer of fabric, and positioning the first layer proximate the electroluminescent panel for bonding to the bonding material.

10. The method of claim 1, which further comprises affixing the image(s) of the backlit lenticular assembly of process (b) to the lenticular.

11. The method of claim 1, which further comprises affixing the image(s) of the backlit lenticular assembly of process (b) to the electroluminescent panel.

12. The method of claim 1, which further comprises affixing the image(s) of the backlit lenticular assembly of process (b) to a support which is removably attached to the assembly.

13. The method of claim 1, which further comprises forming the lenticular, image(s), and electroluminescent panel of the backlit lenticular assembly of process (b) as an integral unit, and removably containing the assembly in the compartment.

14. The method of claim 1, which further comprises forming the compartment of the backlit lenticular assembly of process (b) with a transparent viewing window adjacent the lenticular.

15. The method of claim 1, further comprising providing a battery to power the electroluminescent panel.

16. The method of claim 1, wherein the lenticular, image(s) and electroluminescent panel are bonded together as an integral unit that is then bonded to the article.

17. The method of claim 1, wherein the assembly is affixed to the article by placement in the compartment and the compartment includes a backing material that includes a flange for attachment to the bonding material of the article.

18. The method of claim 1, wherein the compartment has a transparent viewing window adjacent the lenticular and the image(s) is provided on a support and in a manner that facilitates removal and replacement of the image(s) and support.

19. The method of claim 18, wherein the image is adhered to the support with an optically clear adhesive so that it is removable with the lenticular.

20. The method of claim 1, wherein the bonding material comprises plastisol ink that is doped with a vinyl resin and is applied in an amount to provide a desired elasticity to the article.

21. The method of claim 1, which further comprises forcing the bonding material into the article by using a bull nose squeegee to impregnate the article with the bonding material, followed by heat curing of the bonding material with an infrared flash to mechanically bond the plastisol ink and vinyl resin to the article.

22. The method of claim 1, wherein the wearable article is a shirt, blouse, bra, pants, shorts, bathing suit, vest, coat, jacket, robe, hat, purse, scarf, backpack, fanny pack, or belt, and further comprising a battery for powering the electroluminescent panel.

23. The method of claim 1, which further comprises providing a battery for powering the electroluminescent panel.

\* \* \* \* \*